(12) United States Patent
Elrayyah

(10) Patent No.: US 11,682,906 B2
(45) Date of Patent: Jun. 20, 2023

(54) METHODS AND SYSTEMS OF POWER PRODUCTION

(71) Applicant: Qatar Foundation for Education, Science and Community Development, Doha (QA)

(72) Inventor: Ali Yaseen M E Elrayyah, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 277 days.

(21) Appl. No.: 17/196,372

(22) Filed: Mar. 9, 2021

(65) Prior Publication Data

US 2021/0288502 A1 Sep. 16, 2021

Related U.S. Application Data

(60) Provisional application No. 62/988,637, filed on Mar. 12, 2020.

(51) Int. Cl.
*H02J 3/38* (2006.01)
*H02J 13/00* (2006.01)
(Continued)

(52) U.S. Cl.
CPC ............ *H02J 3/381* (2013.01); *G05B 13/042* (2013.01); *H02J 3/004* (2020.01); *H02J 3/32* (2013.01);
(Continued)

(58) Field of Classification Search
CPC .... H02J 3/381; H02J 3/004; H02J 3/32; H02J 13/0005; H02J 2203/20; H02J 2300/26;
(Continued)

(56) References Cited

U.S. PATENT DOCUMENTS 7,158,395 B2 * 1/2007 Deng ................... G05F 1/67
363/95
2009/0316452 A1 * 12/2009 Kim .................... G05F 1/67
363/60
(Continued)

FOREIGN PATENT DOCUMENTS

KR      101555274 B1 * 10/2015
WO   WO-2015016006 A1 * 2/2015 ............ G05F 1/67

OTHER PUBLICATIONS

Charles, et al; "Sustainable energy storage for solar home systems in rural Sub-Saharan Africa—A comparative examination of lifecycle aspects of battery technologies for circular economy, with emphasis on the South African context"; Jan. 1, 2019; vol. 166; pp. 1207-1215 (27 pages).
(Continued)

*Primary Examiner* — Mohammad Ali
*Assistant Examiner* — Dhruvkumar Patel
(74) *Attorney, Agent, or Firm* — K&L Gates LLP

(57) ABSTRACT

A distributed energy management system includes a photovoltaic (PV) source, and a plurality of controllable loads in communication with the PV source. The plurality of controllable loads include a first controllable load including a first interactive plug associated with a first connected state timer and a first disconnected state timer, and a second controllable load including a second interactive plug associated with a second connected state timer and a second disconnected state timer. The PV source is configured to determine a maximum PV power, determine a difference between the maximum PV power and a current PV power, responsive to determining that the difference is less than or equal to a threshold power, set the reference AC voltage as a first voltage, and responsive to determining that the difference is greater than the threshold power, set the refer-
(Continued)

ence AC voltage as a second voltage greater than the first voltage.

22 Claims, 19 Drawing Sheets

(51) Int. Cl.
  *H02J 3/32* (2006.01)
  *G05B 13/04* (2006.01)
  *H02J 3/00* (2006.01)
(52) U.S. Cl.
  CPC ....... *H02J 13/0005* (2020.01); *H02J 2203/20* (2020.01); *H02J 2300/26* (2020.01)
(58) Field of Classification Search
  CPC .. H02J 3/14; H02J 7/35; G05B 13/042; Y02B 10/10; Y02B 70/3225; Y02B 90/20; Y02E 10/56; Y02E 70/30; Y04S 20/12; Y04S 20/222
  See application file for complete search history.

(56) References Cited

U.S. PATENT DOCUMENTS

| | | | |
|---|---|---|---|
| 2011/0264288 A1* | 10/2011 | Khajehoddin | G05F 1/67 700/287 |
| 2012/0242152 A1* | 9/2012 | Escobar | G05F 1/67 307/77 |
| 2019/0207390 A1* | 7/2019 | Restrepo | H02J 13/00002 |

OTHER PUBLICATIONS

Femla, et al: "Optimization of Perturb and Observe Maximum Power Point Tracking Method"; Aug. 2005; IEEE Transactions on Power Electronics; (12 pages).
Dauenhauer, et al.; "Effects of load estimation error on small-scale off-grid photovoltaic system design, cost and reliability"; Oct. 2016; Energy for Sustainable Development; (42 pages).
Enphase Energy, Inc.; "Ensemble—a truly grid agnostic solution"; https://enphase.com/en-us/enphase-ensemble#modal-6280; retrieved Dec. 22, 2019.

* cited by examiner

Table 1. Parameters of the studied system

| Parameter | | Value |
|---|---|---|
| $V_{dc}^{ref}$ | | 377 (V) |
| Frequency | | 50 (Hz) |
| $V_{dc}^{ref,1}$ | | 320 (V) |
| $V_{dc}^{ref,2}$ | | 333 (V) |
| $T_{Set}$ | | 180 (s) |
| $t_{upp}$ | | 2 (s) |
| $P_{PV}$ | | 600 (W) |
| $V_{dc}^{LPV}$ | | 300 (V) |
| $V_{dc}^{HP}$ | | 330 (V) |
| Load$_1$ | Power | 0.9 (kW) |
| | $T_1^{OFF}$ | 16 (s) |
| | $T_1^{ON}$ (initially) | 8 (s) |
| | $f_1^m$ | 3.0 |
| | $f_1^s$ | 0.0 |
| Load$_2$ | Power | 1.8 (kW) |
| | $T_2^{OFF}$ | 12 (s) |
| | $T_2^{ON}$ (initially) | 16 (s) |
| | $f_2^m$ | 3.0 |
| | $f_2^s$ | 0.0 |
| Load$_3$ | Power | 2.7 (kW) for $t \leq 14.4$ |
| | | 0.9 (kW) for $t > 14.4$ |
| | $T_3^{OFF}$ | 8 (s) |
| | $T_3^{ON}$ (initially) | 20 (s) |
| | $f_3^m$ | 3.0 |
| | $f_3^s$ | 0.0 |

METHODS AND SYSTEMS OF POWER PRODUCTION

PRIORITY CLAIM

This application claims priority to U.S. Provisional Patent Application No. 62/988,637, filed on Mar. 12, 2020, the entire contents of which are hereby incorporated by reference and relied upon.

BACKGROUND

In regions that suffer frequent power outages, photovoltaic (PV) systems seem to be attractive. In available PV systems, however, batteries are needed to operate in non-grid connected mode. Including these batteries imposes a significant cost increase to the system which may demotivate customers from adopting PV-based solution for such application. Furthermore, PV sources directly coupled to water pumping systems becomes very common in off-grid farms and remote communities, and in many cases, the installed PV capacity is oversized to provide needed water quantities under the worst operating conditions. Better resources utilization can be achieved if other loads could be attached with pump to make use of any additional PV power.

SUMMARY

According to one non-limiting aspect of the present disclosure, a distributed energy management system may include a photovoltaic (PV) source, and a plurality of controllable loads in communication with the PV source. The plurality of controllable loads may include a first controllable load including a first interactive plug. The first interactive plug may be associated with a first connected state timer and a first disconnected state timer. The plurality of controllable loads may also include a second controllable load including a second interactive plug. The second interactive plug may be associated with a second connected state timer and a second disconnected state timer. Each of the first interactive plug and the second interactive plug may be configured to monitor a current peak AC voltage ($V_{AC}^{Pk}$) of the distributed energy management system. The PV source may be configured to control the current peak AC voltage to keep it at a reference AC voltage ($V_{AC}^{ref}$), determine a maximum PV power ($P_{mpp}$) that the PV source can produce at a given time, determine a difference between the maximum PV power ($P_{mpp}$) and a current PV power ($P_{PV}$), determine whether the difference is greater than a threshold power ($P_{TH}$), responsive to determining that the difference is less than or equal to the threshold power, set the reference AC voltage ($V_{AC}^{ref}$) as a first voltage ($V_{AC}^{ref\,1}$), and responsive to determining that the difference is greater than the threshold power, set the reference AC voltage as a second voltage ($V_{AC}^{ref2}$) greater than the first voltage.

According to another non-limiting aspect of the present disclosure, a method of controlling a distributed energy management system includes monitoring a current peak AC voltage ($V_{AC}^{Pk}$) of the distributed energy management system, controlling the current peak AC voltage ($V_{AC}^{Pk}$) to keep it at a reference AC voltage ($V_{AC}^{ref}$), determining a maximum PV power ($P_{mpp}$) that the PV source can produce at a given time, determining a difference between the maximum PV power ($P_{mpp}$) and a current PV power ($P_{PV}$), determining whether the difference is greater than a threshold power ($P_{TH}$), responsive to determining that the difference is less than or equal to the threshold power, setting the reference AC voltage ($V_{AC}^{ref}$) as a first voltage ($V_{AC}^{ref\,1}$), and responsive to determining that the difference is greater than the threshold power, setting the reference AC voltage as a second voltage ($V_{AC}^{ref2}$) greater than the first voltage.

Additional features and advantages are described herein, and will be apparent from the following Detailed Description and the figures.

BRIEF DESCRIPTION OF THE DRAWINGS

Features and advantages of the technology described herein may be better understood by reference to the accompanying drawings in which:

FIG. 16 shows a table with example parameters and example parameter values of the distributed energy management system of FIG. 15 according to an example of the present disclosure.

DETAILED DESCRIPTION

Figure 1:
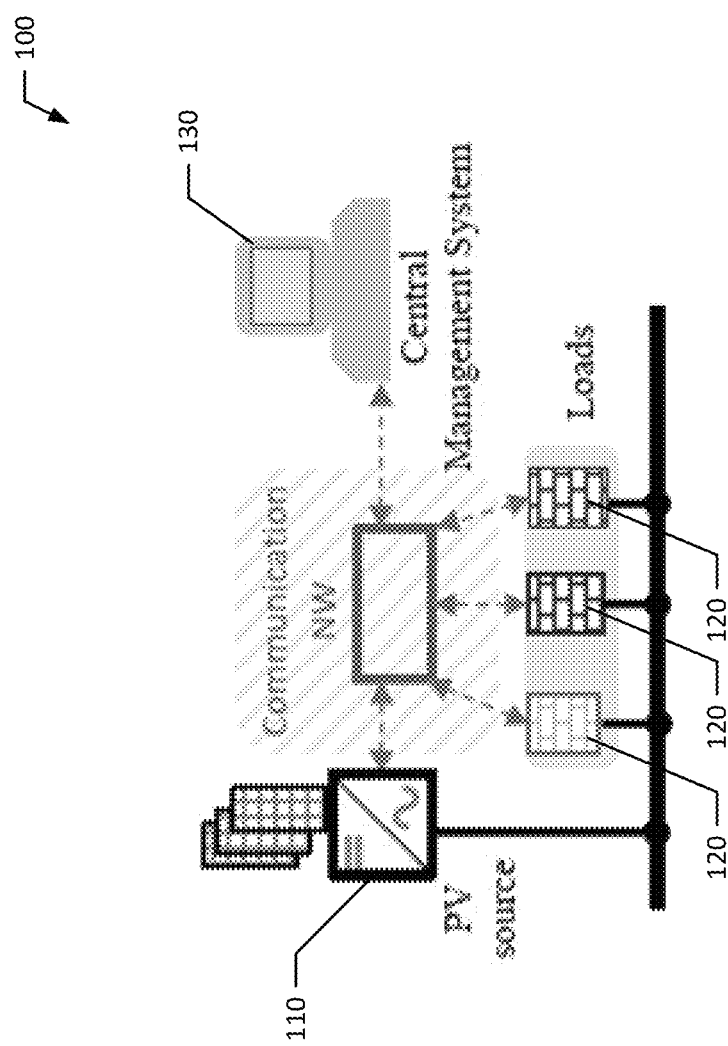
FIG. 1 shows an example structure of a centralized-based system.

The present disclosure generally relates to PV systems, for example, installed in buildings and methods for controlling the PV systems. Many countries in the world suffer from unsteady electricity supply from grid power networks. The unreliable power supply in these regions directed customers to search for alternative power sources. Solar PV-based power sources in many cases seem to be attractive to serve these applications as there is no need for fuel supply or maintenance beside the ease of their installation. However, as PV supplied power may depend greatly on atmospheric conditions and show very weak correlation with required loads profile, battery storage may be usually needed to operate building in off-grid operating mode. However, the battery storage might represent more than 75% of the overall system cost, and this may demotivate people in many cases from adopting PV-based system for this application.

Regions that receive a continuous reliable power supply might experience power outages from time to time and it is quite common to find some of the served customers have PV installed in their buildings. Unfortunately, those PV installations may become almost useless during power outages as they are not supported by batteries. These two applications show that PV sources could be very helpful to supply power during very critical situations; however the variability and unpredictability of their power output may make them unqualified to have a positive role in such cases.

In the present disclosure, a method and a system for enhancing the usefulness of PV sources during power outages are disclosed. The disclosed method and system may be different from available off-grid PV applications. In off-grid PV applications, the power grid absence may represent the norm of the system operation and thus availability of energy storage component within the system is mandatory and greatly justified. Energy storage in off-grid PV system may not have to be necessarily of electrochemical batteries type; rather it can be in the form of hydro or thermal storage. It can be observed that in an off-grid PV system, any capability inherent in the load to store energy is utilized to buffer the variations in PV power supply and maximize its usefulness and value. In the case of buildings that suffer power outages, usually there are limited storage capabilities, yet it is highly desirable to maximize the utilization of PV produced power in these buildings during outages.

Nevertheless, the system according to the present disclosure can have an application for off-grid systems such as PV-based water pumps used in farms or for remote communities. PV-based pumps have PV modules, inverter, and variable speed pumps that pump water onto tanks. The variable speed pumps adjust their speed based on available PV power to maximize the system usefulness. However, when these systems are sized considering factors like autonomy days and days with low PV power yield to make sure that the minimum demand of water is met. Accordingly, the system may be oversized to accommodate for these situations. In days with normal conditions, there could be more PV supply than what is needed to provide water for the immediate need and at the same time any provided water storage tank is full. In these situations, the PV system may stop supplying power as it may not be able to use the additional supply of water. The system can then be used to detect these situations and make use of the available PV power for other services which can include, to make ice that can be distributed within the community, to be used for grain milling, or to charge some batteries. In this way, aspects of the present disclosure may advantageously maximize the utilization of PV resources while fulfilling all system basic needs.

The methods and systems according to the present disclosure may serve as a distributed energy management system for PV produced power during power outages. It may use low cost hardware components and coordinated control algorithms to enable loads to utilize available PV resources and serve the demand to the largest possible extent. Loads are operated to draw power from the PV source whenever possible, but they may independently cease consuming power when it is not possible to serve the loads besides other loads that have higher priority levels. Hardware and controllers may also be provided to tackle critical operations issues such that high inrush motor currents which may not be easily supportable by PV inverters.

Figure 2:
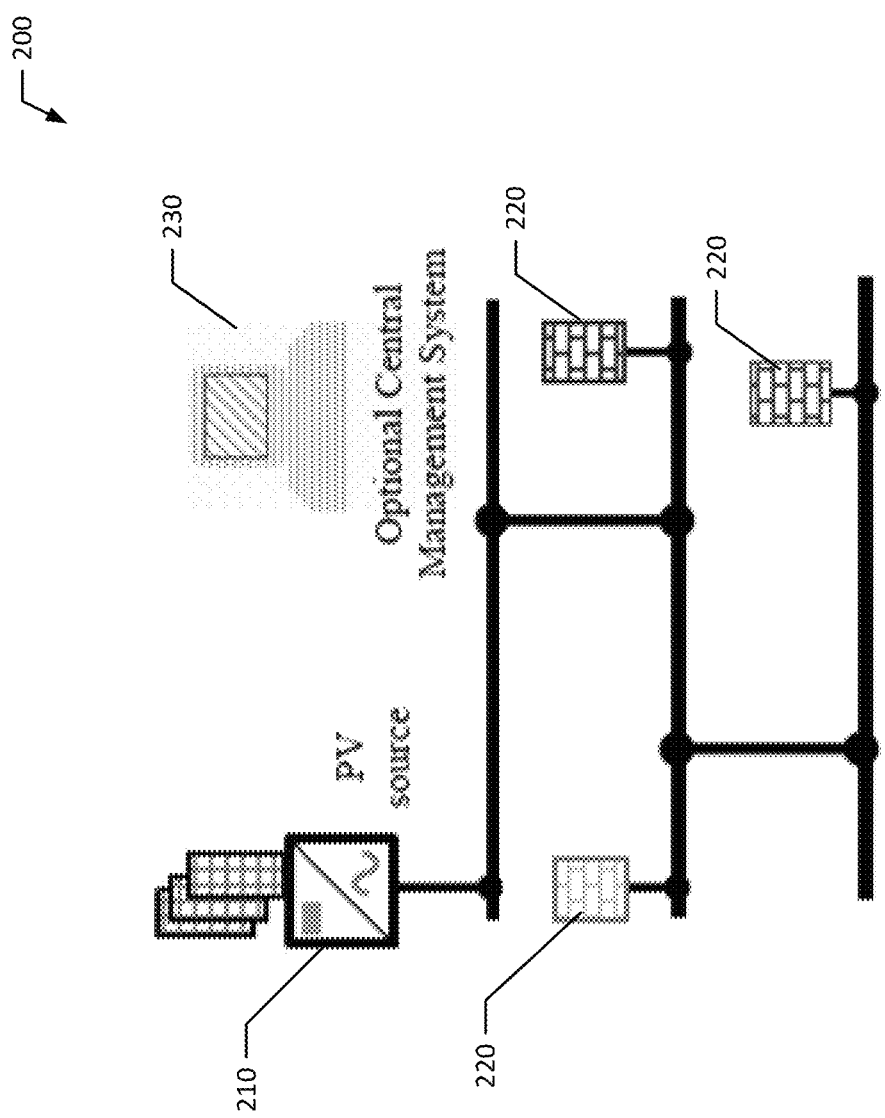
FIG. 2 shows an example structure of a distributed-based system according to an example of the present disclosure.

A system may include a PV source, controllable loads, and/or management unit/system. The PV source may include PV modules, inverters and/or a control system. The controllable load may include appliances and/or interactive plugs. There may be two system configuration options to operate such a system as shown in FIGS. 1 and 2. The first option is the centralized system 100 shown in FIG. 1. In FIG. 1, the system 100 may include a PV source 110, controllable loads 120, and management system 130. The management unit 130 may represent the heart of the system 100. In this case, the management unit 130 may communicate with all plugs and PV sources to determine the available amount of supply and needed power demand. It then may instruct various loads to be turned On/OFF to maintain supply-demand balance. Moreover, the management unit 130 may represent a gateway for the interaction between the system user and the appliances. The main drawback of this configuration option is its strong reliance on the management unit 130 since its failure may make the whole system nonfunctional. This option may also require very fast and reliable communication between plugs and sources in one side and the management unit in the other to maintain stable operation which may increase the system complexity and cost. This may imply certain constraints on the physical dimension of a served power system. Moreover, PV power fluctuations can have damaging impact on some appliances as the fluctuations need to be first detected by the management unit 130 before it issues any command to turn the appliances OFF.

Option 2 system 200 shown in FIG. 2 may overcome the shortcomings of option 1 system. In FIG. 2, the system 200 may include a PV source 210 and controllable loads 220. Option 2 is based on a distributed control scheme where the sources and loads controller operate based on local measurement. In this case, PV source controller may adjust the line voltage and this value may be detected by the various loads. Based on the value of line voltage, various loads can be turned On/OFF depending on coordinated control logics. Accordingly, there may be no need for fast communication among the various components and the issue of power fluctuation can be determined directly by the PV source which may then adjust the voltage to an appropriate value. A management unit 230 can be optionally integrated with the system in this case to allow use appliances interactions and to perform any needed long term demand management. Nevertheless, the absence of this management unit 230 may not lead to failure in the whole system.

Loads Classifications

In some examples, load classification may be made to determine appliances that could be served by the system and method according to an example of the present disclosure. In buildings with few kilo-watts of PV installations, it could be appropriate to classify loads into the following categories: (1) Light loads without inrush current; (2) Light loads with inrush current; and (3) Heavy loads.

The classification of light/heavy loads may be based on the PV system to carry on such a load. For example, any load that cannot be served by the installed PV system may be considered to be heavy load while those that can be supplied by that PV system may be considered as light loads. Heavy loads could include HVAC systems, washing machines, dish-washers, microwaves etc. Light loads can include electronic equipment along with their chargers and lamps. Two categories of light loads (with/without inrush current) may be considered in the list above since motor-based light loads may require relatively high inrush current which can overstress installed PV inverters and might lead to momentary system collapse.

Light loads with inrush current may cause some issues to a PV-based system. First, home appliances like fans, blenders, and shavers could urgently be needed during power outages while the PV system might not have the capacity to get them starting despite the fact that their steady state power consumption could very easily be supplied by the PV source. Second critical loads like freezers and refrigerators may need to be kept operational all the time, however their On-Off operational nature may expose the PV system to a repeated sequence of inrush currents and, accordingly, may make it ineffective.

The present disclosure may cover two areas. The first area is an approach to supply light loads in a PV powered building during power outages during steady state operation. The second area is an inverter structure and operation to address the issue of inrush current associated with light loads.

System Components and Structure

Figure 3:
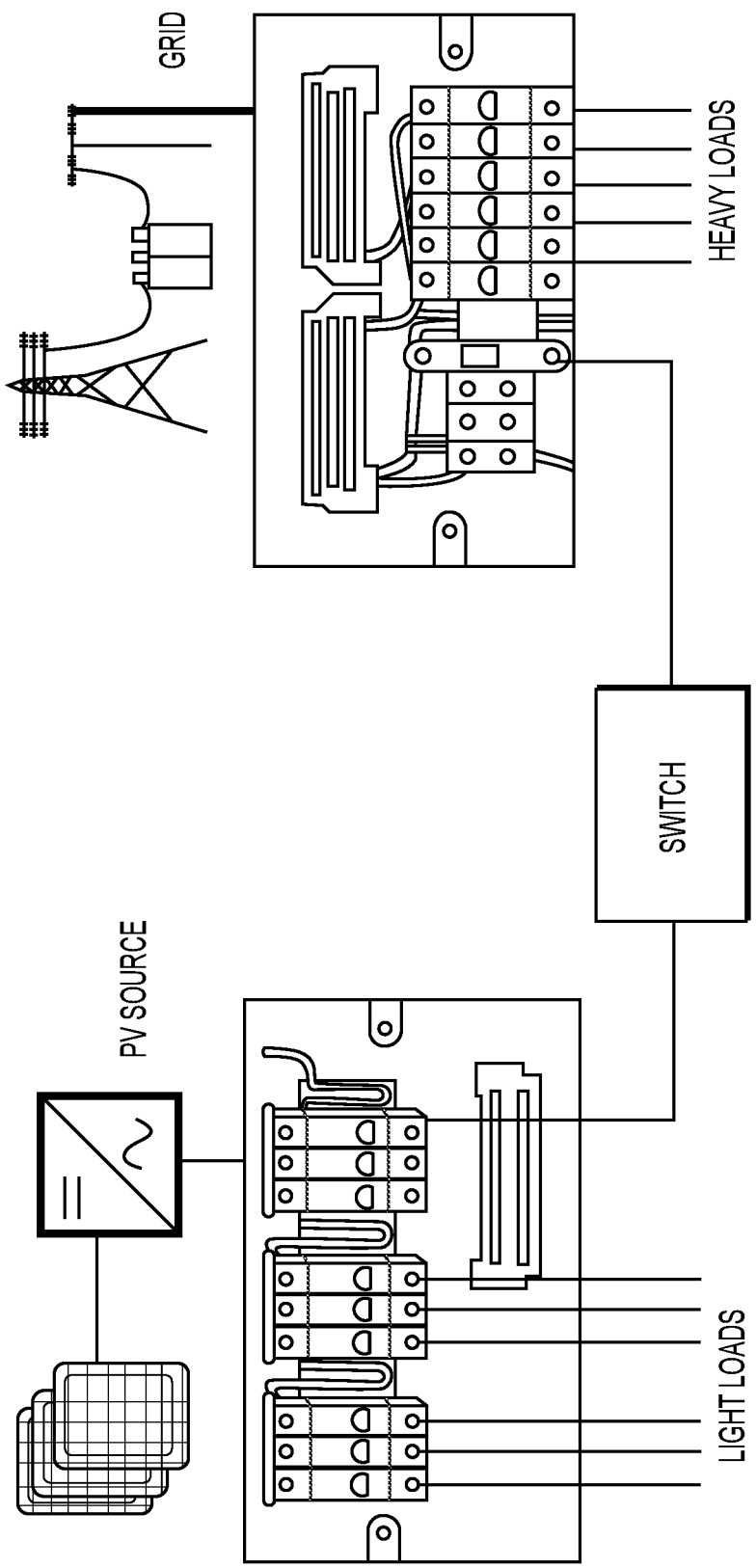
FIG. 3 shows a diagram of an example load distribution among different distribution boards to support isolated PV-based power supply.

In some examples, for power system with PV installation, the loads could be divided among various distribution boards such that light loads that need to be supplied by PV sources can easily be isolated as shown in FIG. 3. When there is a power outage from the grid, the switch may be opened making light loads solely integrated with PV source. This section may assume that all loads and appliances start with no significant inrush current, while the next section deals with the issue of inrush current elimination. The operation of the various components is described in detail below.

PV Source Control Logic

Figure 4:
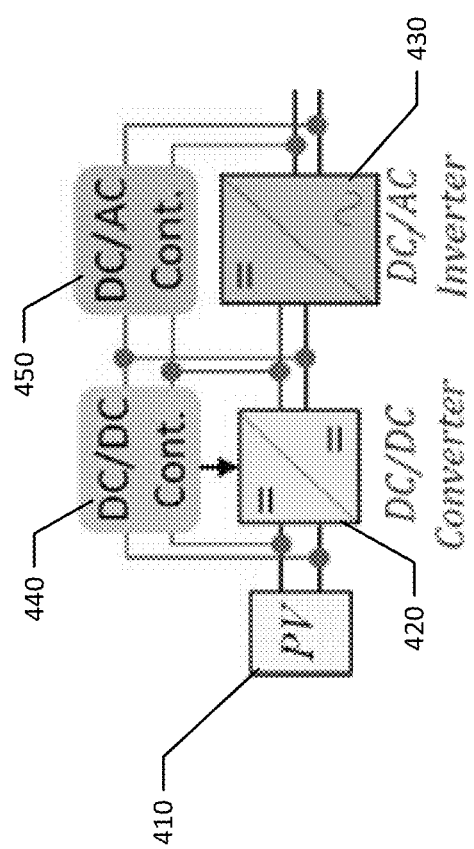
FIG. 4 shows a diagram of a PV source according to an example of the present disclosure.

A PV source (e.g., PV source 210) may include PV modules 410, a DC/DC converter 420, a DC/AC inverter 430, and controllers 440, 450, as shown in FIG. 4. During grid connected operation, the inverter can operate as current source or voltage control source. However, when operated as current source, the grid disconnection may lead to unstable operation in the inverter and thus it may trip and restart operating as voltage source. On the other hand, voltage source based operation can support seamless transition to isolated PV operation.

In some examples, the PV inverter may operate as a voltage source during isolated operation mode. The DC/DC converter 420 may operate to extract power from modules 410 and supply it to the DC bus. The DC/AC inverter 430 may operate to regulate the AC voltage at inverter output. The inverter may adjust three parameters: the AC voltage magnitude, frequency, and phase. The frequency and phase may be set at standard frequency and zero phase since that voltage may represent the reference angle in the system. The magnitude may be set through the adjustment of the modulation index $m_a$ which may be defined as the ratio between the peak AC voltage and the DC bus voltage and it can be set in the range $0 \leq m_a \leq 1$.

Figure 5:
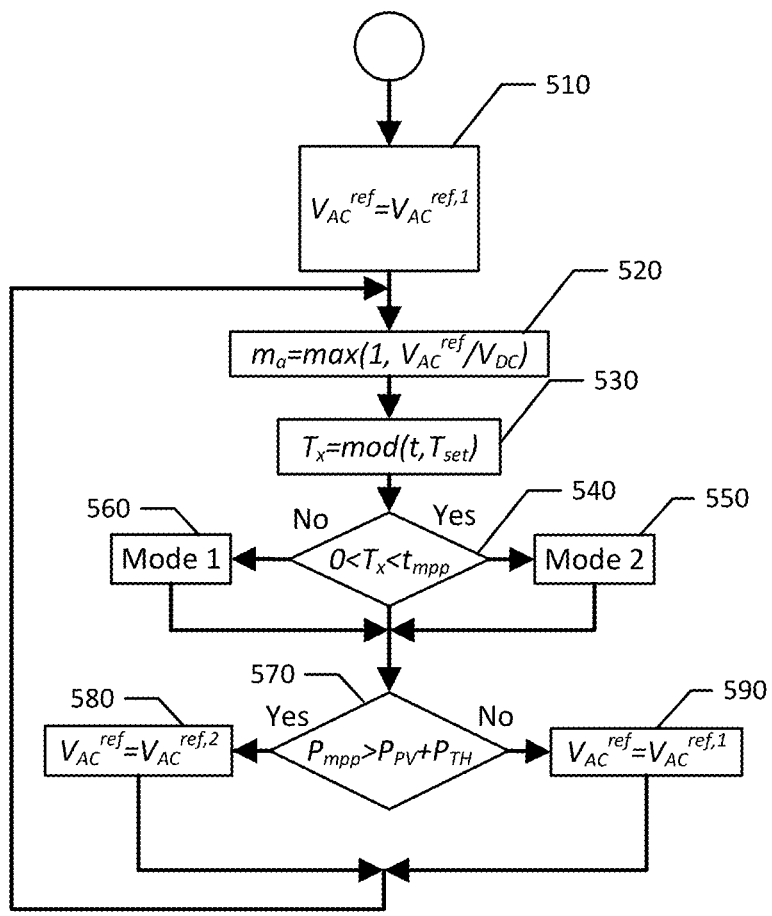
FIG. 5 shows a flowchart illustrating an example process of controlling the PV source according to an example of the present disclosure.
Figure 6:
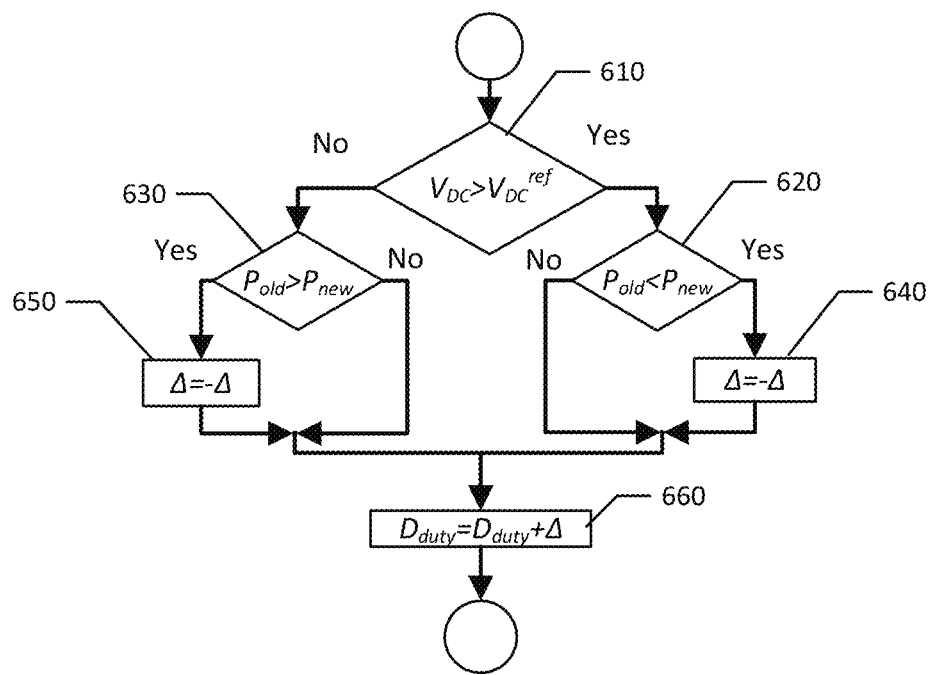
FIG. 6 shows a flowchart illustrating an example process of controlling the PV source (e.g., DC/DC operation) under Mode 1 of FIG. 5 according to an example of the present disclosure.
Figure 7:
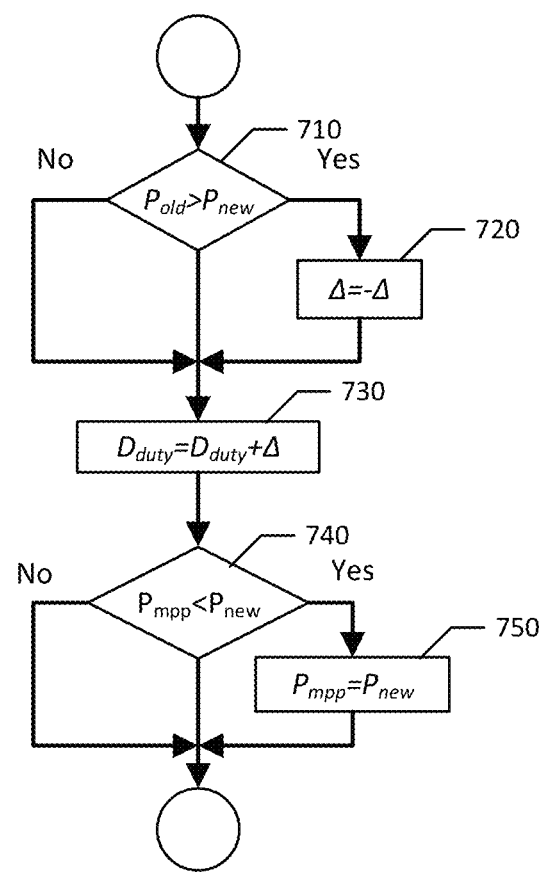
FIG. 7 shows a flowchart illustrating an example process of controlling the PV source (e.g., DC/DC operation) under Mode 2 of FIG. 5 according to an example of the present disclosure.

The flow chart of the PV control logic may be shown in FIGS. 5-7. As shown in FIG. 5, initially, $V_{AC}^{ref}$ may be set as $V_{AC}^{ref,1}$ (normal AC reference voltage) (block 510). The inverter controller may keep on adjusting $m_a$ to have AC peak voltage at the reference value $V_{AC}^{ref}$, accordingly, as shown at block 520, it may be given by:

$$m_a = \max(1, V_{AC}^{ref}/V_{DC}) \quad (1)$$

where max(x, y) may provide the largest value between x and y and $V_{DC}$ is the DC bus voltage.

The DC/DC side controller can operate in one of two modes. In Mode 1 (block 560), the DC/DC converter may be operated to regulate the DC bus voltage at the required reference value $V_{DC}^{ref}$. On the other hand, Mode 2 (block 550) may be activated for short duration ($t_{mpp}$) in regular intervals, for example, every $T_{set}$ second, to determine the maximum amount of power that could be supplied by the PV modules. For example, $T_x$ value is obtained by mod(t, $T_{set}$), which may return the remainder after division oft by $T_{set}$ (block 530). When t is 5 seconds and $T_{set}$ is 180 seconds, $T_x$ is 5. Then, it may be determined whether $T_x$ has a value greater than 0 and below $t_{mpp}$ (block 540). If $T_x$ does not have a value greater than 0 and below $t_{mpp}$, Mode 1 is selected (block 560). If $T_x$ has a value greater than 0 and below $t_{mpp}$, Mode 2 is selected (block 550). For example, if $T_x$ is 5 and $t_{mpp}$ is 2 (seconds), Mode 1 is selected.

Mode 1 may be shown in the flow chart in FIG. 6, where it may represent a variation of the perturb-&-observe MPPT algorithm. More details about the perturb-&-observe MPPT algorithm may be disclosed in N. Femia, P. Giovanni, S. Giovanni Spagnuolo, V. and Massimo "Optimization of perturb and observe maximum power point tracking method." IEEE trans. power electro. vol. 20, no. 4, pp. 963-973, 2005, which is herein incorporated by reference in its entirety.

The duty ration of the DC/DC converter ($D_{duty}$) may be varied by a small value A (block 660) whose sign may vary depending on whether the search is moving toward the right or wrong direction. In some examples, it may be determined whether $V_{DC}$ is higher than $V_{DC}^{ref}$ (block 610). Then, it may be determined whether the DC/DC converter supplied power is increasing/decreasing (blocks 620, 630). If $V_{DC}$ is higher than $V_{DC}^{ref}$ (Yes at block 610) for a given polarity of A, the DC/DC converter may need to supply less power. Accordingly, if the DC/DC converter supplied power is increasing (Yes at block 620) then the polarity of Δ may need to be reversed (block 640). Likewise, if $V_{DC}$ is less than $V_{DC}^{ref}$ (No at block 610), the DC/DC converter needs to supply more power. Therefore, if the DC/DC supplied power is decreasing (Yes at block 630) then A has the wrong sign and it may need to be reversed (block 650). Note that, when the total load is higher than the PV maximum power, $V_{DC}$ may never become equal to $V_{DC}^{ref}$ and the above action may make the controller track the MPP which may be the preferred response from the PV source in this case.

Mode 2 may be activated from time to time to determine the maximum power that can be supplied by the PV modules. As shown in FIG. 7, the DC/DC converter may be operated to supply maximum power to the DC bus ($P_{mpp}$) and that value is saved.

For example, it may be determined whether the DC/DC converter supplied power is increasing (block 710). If the DC/DC converter supplied power is decreasing (Yes at block 710), then the polarity of Δ may need to be reversed (block 720). The duty ration of the DC/DC converter ($D_{duty}$) may be adjusted by A (block 730). Then, it is determined whether a new power amount is greater than the current maximum power to the DC bus ($P_{mpp}$) (block 740). If so, the new power is saved as the maximum power ($P_{mpp}$) (block 750). Accordingly, the PV source controller can know at any point in time the additional amount power it can supply to the loads. As explained above, Mode 2 may be activated for a couple of AC side cycles before activating Mode 1 once again.

The identified value of the PV maximum power may be used to determine how much power the PV source can provide. After resuming the operation in Mode 1, the difference $\Delta P_{PV}$ between the actual PV produced power ($P_{PV}$) and the $P_{mpp}$ may be determined as PV available surplus power. Referring back to FIG. 5, in some examples, it may be determined whether $\Delta P_{PV}$ ($=P_{mpp}-P_{PV}$) is higher than a predetermined threshold value $P_{TH}$ (block 570). The predetermined threshold value $P_{TH}$ may be selected to be suitable to supply a reasonable appliance. If $\Delta P_{PV}$ is found to be higher than the predetermined threshold $P_{TH}$, the reference value of the AC side voltage may be set to:

$$V_{AC}^{ref} = V_{AC}^{ref,2} = V_{AC}^{ref,1} + \Delta V \tag{2}$$

where $V_{DC}^{ref,1}$ is the normal AC reference voltage, $V_{DC}^{ref,2}$ is a modified reference voltage to indicate extra power availability and $\Delta V$ is positive voltage offset (block 580). As will be discussed below, appliance controllers can detect the increase in the line voltage and some of them might get connected. In this case, the value of $\Delta P_{PV}$ may become less than $P_{TH}$ and the value of $V_{DC}^{ref}$ will be set back to $V_{AC}^{ref,1}$ (block 590). More details about the interactions between PV and appliance controller will be discussed in detail below.

Interactive Plug Control Logic

Figure 8:
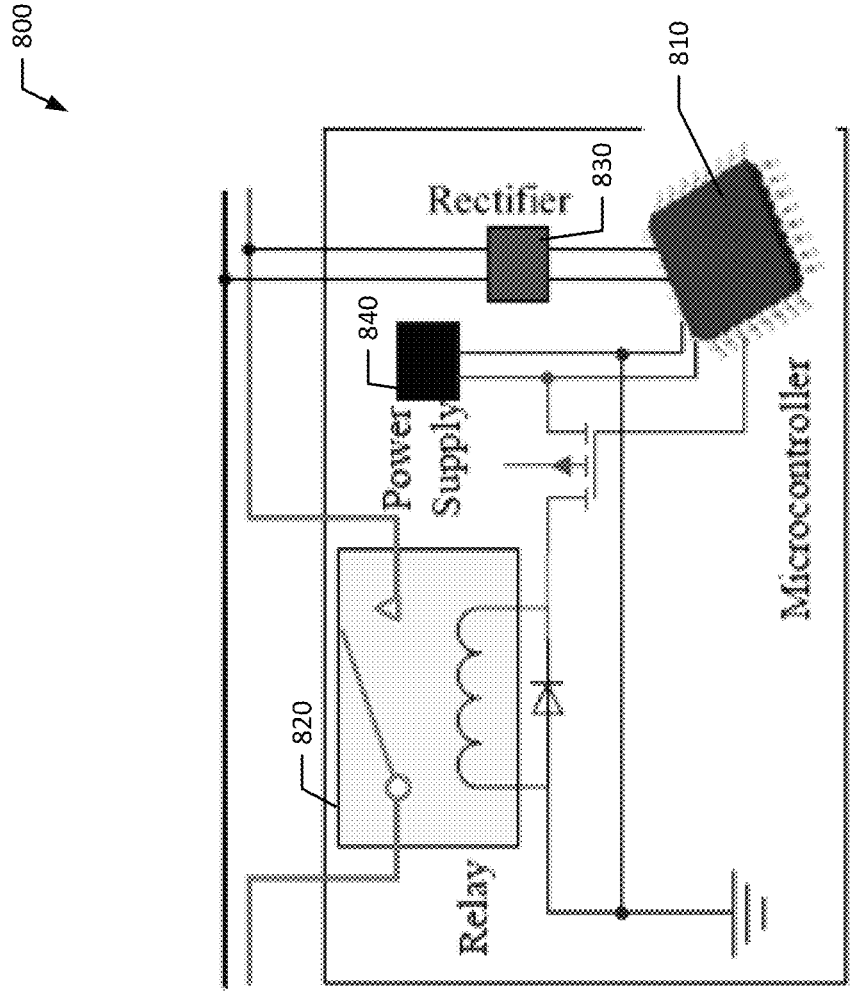
FIG. 8 shows a diagram of an interactive plug according to an example of the present disclosure.

In some examples, as discussed above, a plurality of interactive plugs may be provided to control various appliances. FIG. 8 illustrates an example interactive plug 800. The interactive plug 800 may include a microcontroller 810, a relay 820, a rectifier 830, and a power supply chip 840.

The interactive plug microcontroller 810 may sense the line voltage to determine the peak voltage and it may use multiple timers (e.g., two timers). Based on the line voltage condition, it may turn the relay 820 ON/OFF. Commercially available smart plugs may have more than these basic components. Therefore, available smart plugs that are programmable could be used or one could be designed with the above discussed components and feature to minimize the system cost.

Figure 9:
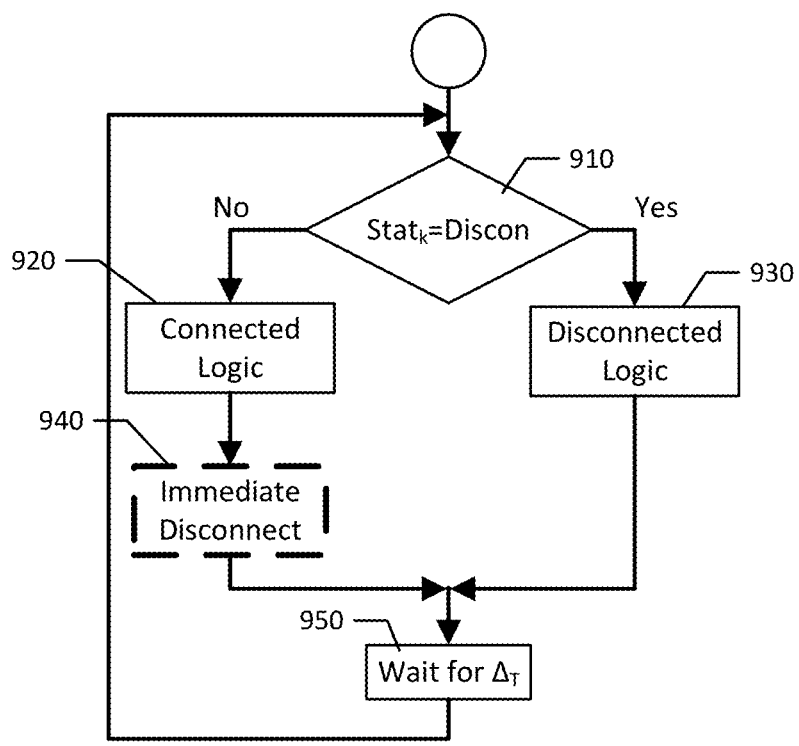
FIG. 9 shows a flowchart illustrating an example process of controlling an interactive plug/load according to an example of the present disclosure.
Figure 10:
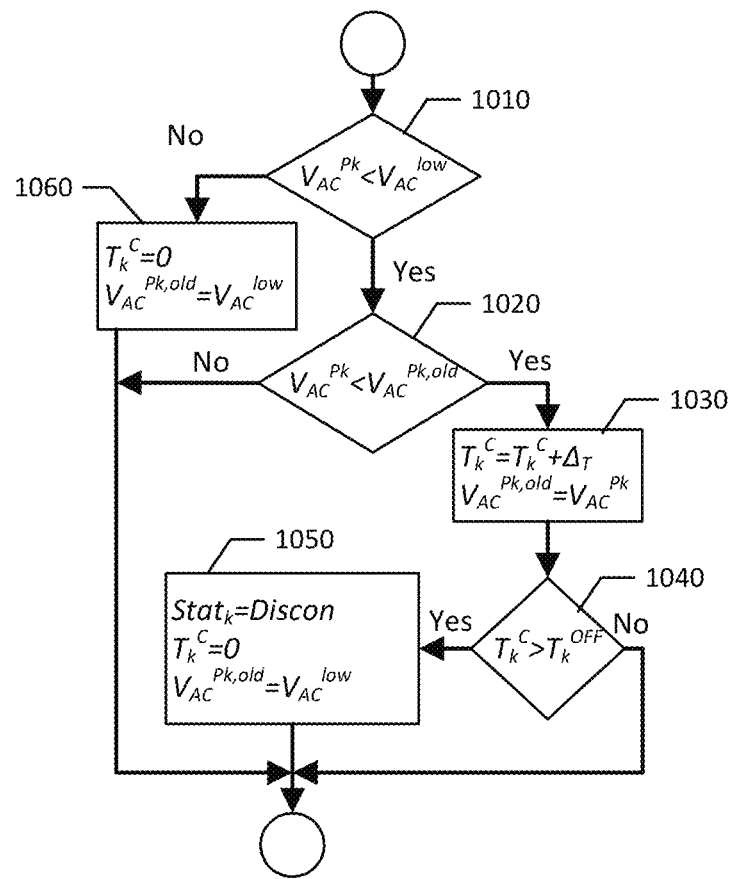
FIG. 10 shows a flowchart illustrating an example process of controlling the interactive plug/load of FIG. 9 when the interactive plug/load is in a connected state according to an example of the present disclosure.
Figure 11:
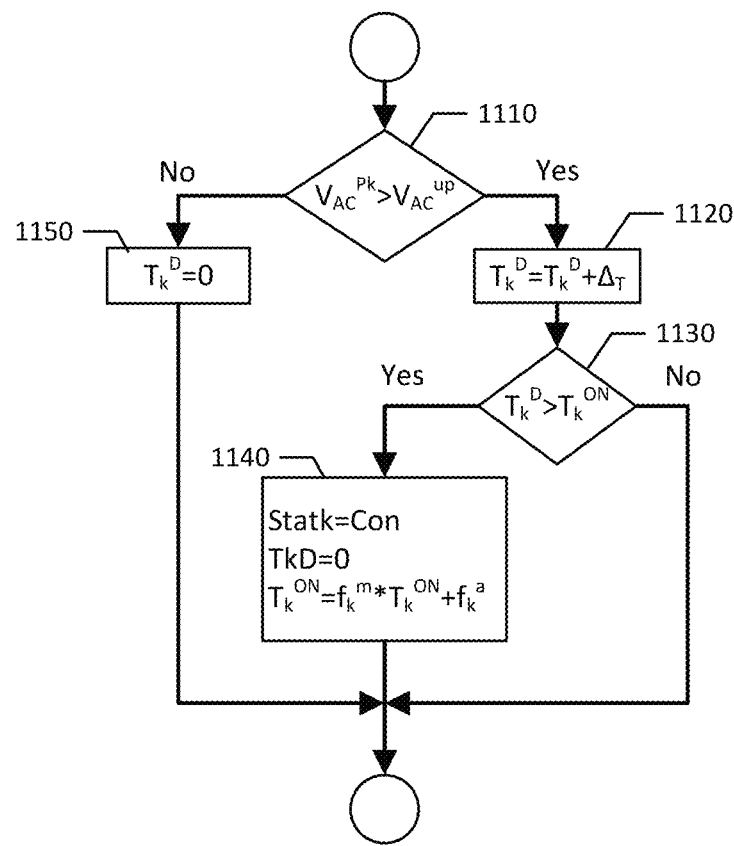
FIG. 11 shows a flowchart illustrating an example process of controlling the interactive plug/load of FIG. 9 when the interactive plug/load is in a disconnected state according to an example of the present disclosure.

A control logic of the interactive plug (e.g., at a $k^{th}$ interactive plug) according to examples of the present disclosure is shown in FIGS. 9 to 11. The plug may have a variable $Stat_k$ that may have two values, Discon and Con which corresponds to the OFF and ON status (e.g., relay 820 ON/OFF) of the plug, respectively. The control cycle is assumed to be updated every $\Delta_T$ second (block 950) and the following parameters are used within the defined control logic:

Upper limit for the AC peak voltage $V_{AC}^{UP}$.
Lower limit for AC peak voltage $V_{AC}^{LOW}$.
Time to turn OFF for the $k^{th}$ plug $T_k^{OFF}$.
Time to turn ON for the $k^{th}$ plug $T_k^{ON}$.

In some examples, all plugs may have the same value for $V_{AC}^{UP}$ and $V_{AC}^{LOW}$, while the plugs may have different values for $T_k^{OFF}$ and $T_k^{ON}$. The value of $V_{AC}^{UP}$ may be between $V_{AC}^{ref,1}$ and $V_{DC}^{ref,2}$. $V_{AC}^{LOW}$ may be lower than $V_{AC}^{ref,1}$ by a predetermined value, which may allow the plugs controller to clearly differentiate between the two values.

Referring to FIG. 9, in some examples, the interactive plug may determine whether it is in a Discon state or a Con state (block 910). If it is determined that the interactive plug is in the Con state, the interactive plug may follow connected logic (e.g., control when the corresponding load is connected and/or the relay 820 is ON) (block 920). If it is determined that the interactive plug is in the Discon state, the interactive plug may follow disconnected logic (e.g., control when the corresponding load is disconnected and/or the relay 820 is OFF) (block 930).

FIG. 10 illustrates example connected logic that the plugs follow, for example, when the corresponding load is in a connected state. When the plug operates in the Con state, it may draw current from the line and its controller may keep on monitoring the AC line voltage. Changes in loads or PV power may make the demand exceed the supply. In this case, inverter DC bus voltage as well as the AC line voltage may keep on dropping.

In some examples, the plugs may determine whether the peak value of the AC voltage is lower than $V_{AC}^{LOW}$ (block 1010). If it is determined that the peak value of the AC voltage becomes lower than $V_{AC}^{LOW}$, the plug controllers may start timers ($T_k^C$) and that peak voltage may be saved in the variable $V_{AC}^{pk,old}$. At the following control cycle, the plugs may determine whether the AC peak voltage is less than $V_{AC}^{pk,old}$ (block 1020). If it is determined that the AC peak voltage is less than $V_{AC}^{pk,old}$ this may indicate that demand is still higher than supply and thus $T_k^C$ keeps on increasing and $V_{AC}^{pk,old}$ is updated by the new peak voltage (block 1030). The plugs may determine whether the timer $T_k^C$ of the corresponding load/plug exceeds its set value of $T_k^{OFF}$ (block 1040). The process may continue until the timer $T_k^C$ of one of the loads exceeds its set value of $T_k^{OFF}$ and that load may be disconnected and thus change its state to Discon (block 1050). The plug that has the lowest value of $T_k^{OFF}$ may be first to disconnect and thus the setting of $T_k^{OFF}$ for the various loads may provide a prioritizing mechanism. The disconnection of a load can be sufficient to bring the demand below the supply and in this case the AC peak voltage may be increasing.

According to FIG. 10, even if the peak voltage is lower than $V_{AC}^{LOW}$ (e.g., at block 1010), as long as it is not decreasing (e.g., $V_{AC}^{pk} > V_{AC}^{pk,old}$ at block 1020), the timer $T_k^C$ may not be updated. This may allow for the AC bus voltage to recover after the disconnection of some loads. Once the AC peak voltage exceeds $V_{AC}^{LOW}$, the connected plug(s) may reset their timer $T_k^C$ to zero and $V_{AC}^{pk,old}$ to $V_{AC}^{LOW}$ (block 1060) such that they continue normal operation. On the other hand, if the disconnection of a certain load is not sufficient to bring the demand below supply, the AC peak voltage may keep in dropping and other loads may be disconnected until the demand drops below the supply.

FIG. 11 illustrates example disconnected logic that the plugs follow, for example, when the corresponding load is in a disconnected state. In some examples, the disconnected plug(s) may determine whether the AC peak voltage is higher than $V_{AC}^{UP}$ (block 1110). If it is determined that the AC peak voltage is higher than $V_{AC}^{UP}$, the timer $T_k^D$ may start counting (block 1120). For example, as some loads are in the Discon status, the PV source may have surplus power that is sufficient to accommodate some of these disconnected loads. As shown in FIG. 5, when the PV sources has sufficient amount of surplus power, the inverter may raise the AC peak voltage to $V_{DC}^{ref,2}$. All plugs in the Discon status can detect that the voltage level is higher than $V_{AC}^{UP}$ (e.g., at block 1110) and thus recognize the possibility to get served. Timer $T_k^D$ may be started by various loads in the Discon status and as long as the AC peak voltage remains higher than $V_{AC}^{UP}$.

Then, the disconnected plug(s) may determine whether the timer $T_k^D$ exceeds $T_k^{ON}$ (block 1130). When the timer of a certain load exceeds it value of $T_k^{ON}$, (at block 1140) that plug/load may change status to Con, turn the plug ON, and modify the value of $T_k^{ON}$ of the corresponding plug/load to have a higher value. In some examples, the value of $T_k^{ON}$ may be modified according to Eqn. 3:

$$T_k^{ON} = f_k^m T_k^{ON} + f_k^a \qquad (3)$$

where $f_k^m > 1$ and $f_k^a > 0$ are multiplicative and additive parameters for the $k^{th}$ plug. Therefore, $T_k^{ON}$ is updated, for example, according to Eqn. 3 to have a higher value next time. In this way, aspects of the present disclosure may advantageously avoid frequent repetitive ON/OFF switching of loads. For example, when the PV surplus power is less that the power needed by the first load to connect, the line voltage may drop when the load is connected and the same load may get disconnected right away. When the load is disconnected, the same/similar value of PV surplus power may be retained which can lead to repetitive ON/OFF switching of the load, which may be harmful to all components within the power system. Therefore, Eqn. 3 may be used to increase $T_k^{ON}$ such that other loads can have the chance to connect if the $k^{th}$ load is too high to be served by available surplus power, or the load may try to connect again after prolonged periods of time. When the AC peak voltage is not higher than $V_{AC}^{UP}$, the plug may reset the timer $T_k^D$ (block 1150).

The interactive plug logic shown in FIGS. 9-11 may be effective to allow loads/plugs to coordinate their activities effectively without having to use inter-controllers communication. Since the action is detected directly by the loads/plugs, the system response may be faster than the centralized based system shown in FIG. 1.

Figure 12:
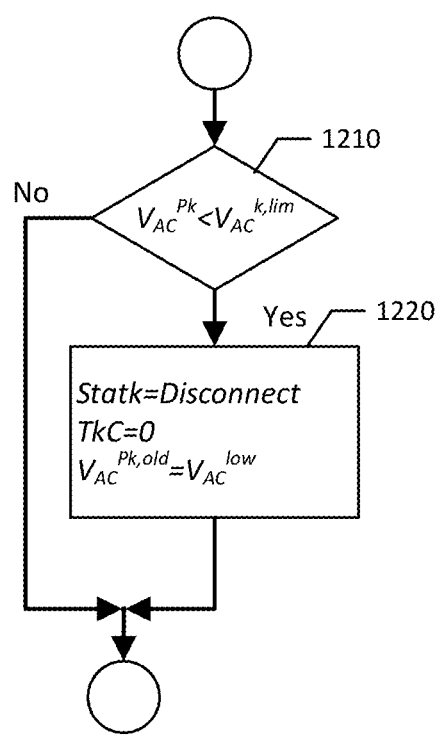
FIG. 12 shows a flowchart illustrating an example process of controlling the interactive plug/load of FIG. 9 when the optional immediate disconnect logic is activated according to an example of the present disclosure.

Referring back to FIG. 9, to enhance system reliability, the optional "Immediate Disconnect" block 940 can be activated. The logic within block 940 may be detailed in FIG. 12, which introduces a lower limit voltage ($V_{AC}^{k,lim}$) for each plug. For example, the plugs/loads may determine whether the peak AC voltage is lower than $V_{AC}^{k,lim}$ (block 1210), which is lower than the lower limit $V_{AC}^{LOW}$. When it is determined that the peak AC voltage is lower than $V_{AC}^{k,lim}$, the plugs/loads may immediately switch to the Discon status, reset the timer $T_k^C$, and/or save $V_{AC}^{pk,old}$ as $V_{AC}^{LOW}$ (block 1220).

Management System

As discussed above, despite being of a distributed nature, an optional management unit can be included in the system as shown in FIG. 2. The management system can serve a number of roles in this system. It may serve as a gateway to allow users to interact with various interactive plugs. It can adjust or update the value of the time set-points and voltage threshold values. It can also send command for appliances scheduling and management. The optional management system function may be to optimize and manage the resources utilization and not to maintain system balance or stable operation. Moving the responsibility to maintain system stability to the loads may enhance system reliability as all components operate coordinately to maintain the stable operation. Moreover, loads can be added as plug & play units especially if loads are broadly categorized into classes and each class has certain settings for timer parameters. This may indicate ease of system planning, integration and deployment beside the low cost and reliable operation.

System Operation

The operation of a PV source and interactive plugs are discussed above. In this section, the overall system operation may be described briefly. During normal operation, the PV source may supply power which is less than its maximum power. In some examples, the DC bus of the PV inverter may be regulated at the reference value. In some examples, every few minutes, the PV inverter may sense the maximum amount of power it can produce. The surplus power at PV source may be determined. When the surplus power exceeds a predetermined value, the PV inverter may increase the peak value of AC voltage. Loads may keep on monitoring the line voltage. For example, connected loads may monitor the line voltage to detect any reduction in it from the reference value. Disconnected loads may monitor the voltage to detect a noticeable increase on it.

Events like increase in the consumption of connected loads, reduction in PV power yield may cause supply to fall short behind the demand, in this case, DC bus voltage as well as AC line voltage may suffer drop. The reduction in the line voltage can produce loads reduction that may balance the supply with demand. In this case, no load disconnection is needed. Otherwise, the line voltage may keep on dropping until it goes below, $V_{AC}^{LOW}$. Loads controllers may keep track of time during which the line voltage is dropping while being below $V_{AC}^{LOW}$.

Some loads may disconnect as their timer expires before others. Serious voltage drop due to significant supply shortage may make some loads disconnect immediately. During this period, the PV may be operated at its MPP. Loads may keep on dropping until the line voltage starts increasing. When the supply exceeds the demand, the line voltage may keep on increasing until it becomes higher than $V_{AC}^{LOW}$. At this instant, connected plugs may reset their timer until the voltage drop later below $V_{AC}^{LOW}$.

Events like load reduction, PV power supply increase, load disconnection may cause the PV to have surplus power that can feed some of the disconnected loads. When the sensed surplus power exceeds a predetermined limit, the PV source may increase the line voltage by a noticeable amount. If the amount of surplus power drops below the required threshold, the PV inverter may retain the line voltage to the regular amount. However, if the availability of sufficient power persists, the line voltage may maintain the new relatively high value for some time.

Disconnected loads can detect that increase in the line voltage and they may start timers. Load with the smallest timer duration, may connect, but it may update its timer set time to a longer duration. The connected loads can lead to one of the following scenarios:

(1) It is lower than the surplus power, but when connected the surplus power becomes less that the threshold. This may make the system to work at a new stable steady state condition.

(2) It is lower than the surplus power and when it is connected, the remaining amount of surplus is still higher than the threshold. In this case, the line voltage may be kept at the increased level allowing more loads to get connected.

(3) It is higher than the surplus power. This case may lead to voltage drop scenario discussed above. However, if newly connected load is the one to disconnect first, it will have to wait for longer time to be connected back since it has larger set time for turn on duration.

By the end of the day, all time set points may be reset to original values.

Battery Integration

Figure 13:
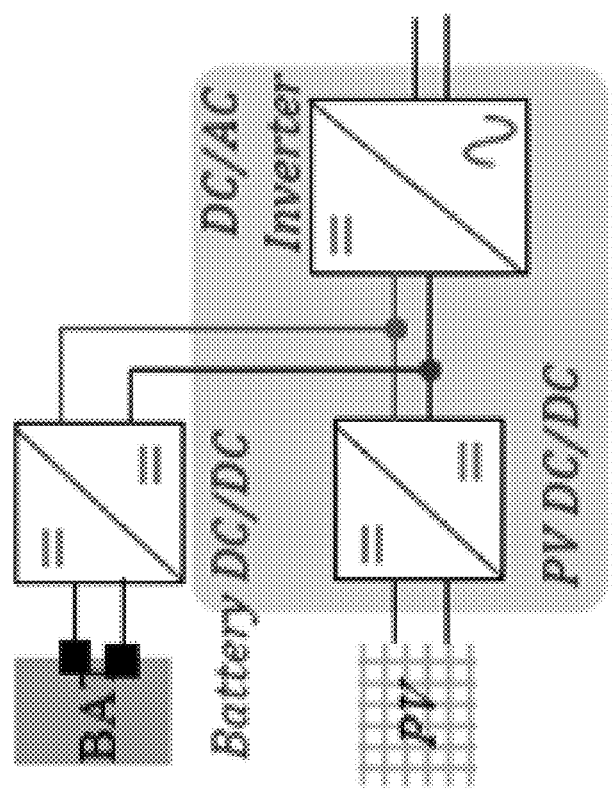
FIG. 13 shows a diagram of a PV source integrated with a battery according to an example of the present disclosure.

In some examples, the system may not include a battery to serve batteryless operation. In other examples, however, batteries can be easily integrated with the system, for example, through the PV source DC bus, as shown in FIG. 13. The battery may operate in the same way as the PV DC/DC converter. The battery could be sized to serve basic needs throughout the day. Its control system can then measure the power supplied to the DC bus by both the battery and the PV module and operate to make sure that that power is always above the limit needed for the basic needs. The rest of the system may work as explained above (e.g., the loads adjust themselves to utilize the available supplied power).

In some examples, during the day-time, the battery could be charged by specific current. Any PV surplus power can be charged to the battery. During night time, the battery could be operated to supply a fixed amount of power needed for the loads basic needs. Loads may then coordinate themselves to share the provided power. In some examples, following the same operation logic for the PV source, the battery controller can make low priority loads to turn OFF and can allow loads to be connected. If newly added loads consume undesirably high power battery, the system can easily drop the voltage to eliminate that load and then allow other loads to be connected. In this way, the battery can be charged/discharged and used with the PV source.

Managing Loads with High Inrush Currents

One of the elements that might introduce operational challenge to the system is starting loads with high inrush current (LHIC), such as motor based loads. Unfortunately, some of the loads in a building are of LHIC type, such as refrigerators, water pumps and some kitchen appliances. Serving LHIC during power outages in many cases could represent the highest priority for users, however, when they are started, they can consume more than 10 times the steady state current of that load for several electrical cycles. The inrush current may impose a number of serious challenges to the operation of the system. First, it may require PV inverters rated for high current which may increase the system cost and make it less attractive to customers. Second, drawing LHIC from the inverter could lead to a momentary significant drop in the DC bus voltage. This may cause loads to disconnect as per the logic explained in FIGS. 9-11. Loads like refrigerators may operate in repeated ON/OFF sequences and thus, the whole system may be exposed to this drop in DC bus very frequently. Third, LHIC from inverters can cause rapid degradation to its switches and thus shorten their life-time.

To address the issue of inrush current, in some examples, soft-starting of motor-based loads can be used. Certain power sockets can be designated to serve LHIC and a variable frequency drive (VFD) for each of these sockets. The VFD can adjust the voltage and frequency supplied to the load and thus has the ability to regulate the starting current to preferred value.

Figure 14B:
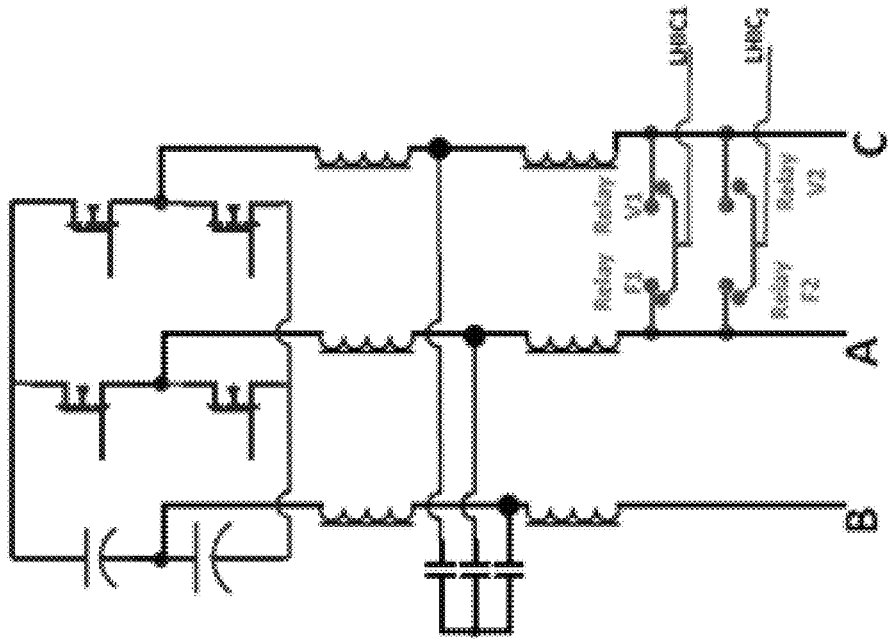
FIG. 14(b) shows a diagram of a 2-leg PV inverter for an inrush current management according to an example of the present disclosure.
Figure 14A:
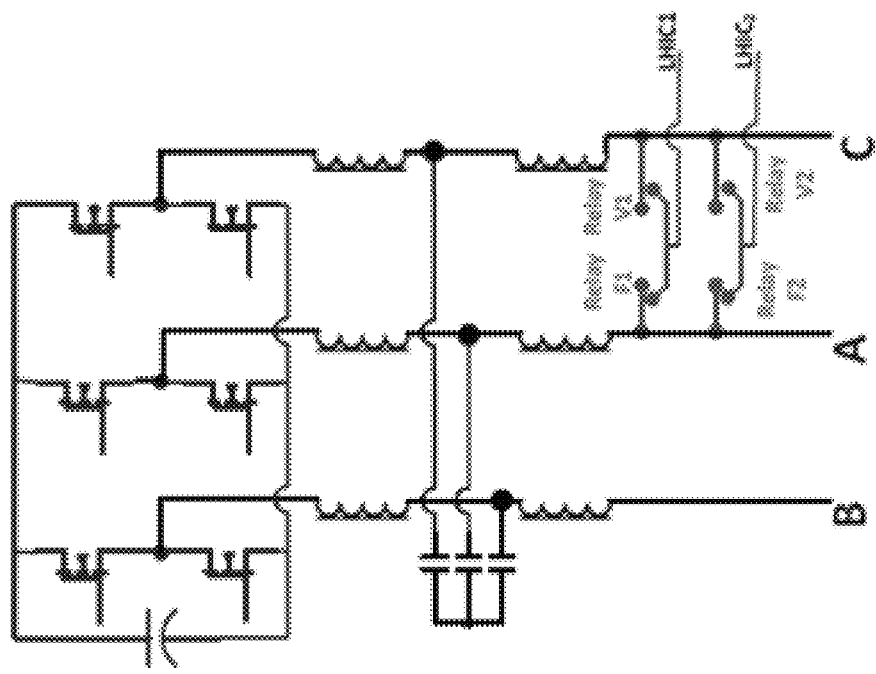
FIG. 14(a) shows a diagram of a 3-leg PV inverter for an inrush current management according to an example of the present disclosure.

In some examples, PV inverters can be modified to address the inrush current issue. FIG. 14(a) illustrates an example PV inverter addressing the inrush current issue. A single PV inverter may be used, for example, in a building, where single phase operation is considered as it is typically used in small buildings. Three phase building can easily be addressed using three single phase inverters. The structure shown in FIG. 14(a) uses three phase inverter in single phase power system to serve two branches. The first branch may be connected to lines A and B to power loads with no inrush current, while lines C and B may serve LHIC. Through proper switch driving, the controller can supply voltages with different frequencies in the two branches. For example, in lines A and B, regular 50/60 Hz voltage may be supplied by the inverter, while in lines C and B, LHIC may be driven by variable frequency to limit the current supplied to the load within an acceptable level. The inverter controller may keep on adjusting and increasing the frequency and angle in lines C and B until it matches the frequency and phase of lines A and B. At that moment, relay $F_k$ could be turned on to get the lines C and B connected with lines A and B and at that time, relay $V_k$ can be disconnected to supply the load at its steady state operation like all other loads in the system. More than one branch could be connected to lines C and B which serve the designated sockets for LHIC. Starting these loads at different time may not impose any inconvenience to the users as the duration to start an appliance takes at most few seconds. As appliances can interchangeably be used over the same socket, very few branches can be connected with lines C and B to sufficiently cover the need of all LHIC.

Three phase inverter is considered in FIG. 14(a) since it is widely available in the market and with a minor update in the control system logic, it can provide the needed service. In some examples, a two leg inverter topology shown in FIG. 14(b) can be used to provide the same or similar functions/features as the inverter in FIG. 14(a).

An advantage of the configuration in FIGS. 14(a) and (b) over the use of dedicated VFD for LHIC is the ability to manage the amount of power supplied to these loads. Since the load supplied power is managed by the PV inverter, lower power could be delivered to these loads when no sufficient supply is available which add more flexibility than ON/OFF approach utilized by other loads. This feature may allow some heavy loads to be utilized at partial power such as HVAC systems and washing machines.

Example

Figure 15:
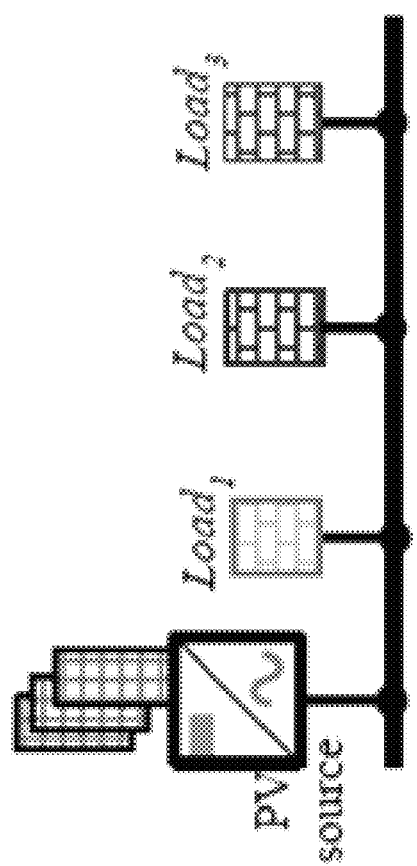
FIG. 15 shows a distributed energy management system according to an example of the present disclosure.

The system shown in FIG. 15 is simulated to verify the effectiveness of the system according to an example of the present disclosure. In this example, a PV source is integrated with three loads. The parameters considered in this simulation are listed in Table 1 as shown in FIG. 16.

Figure 17:
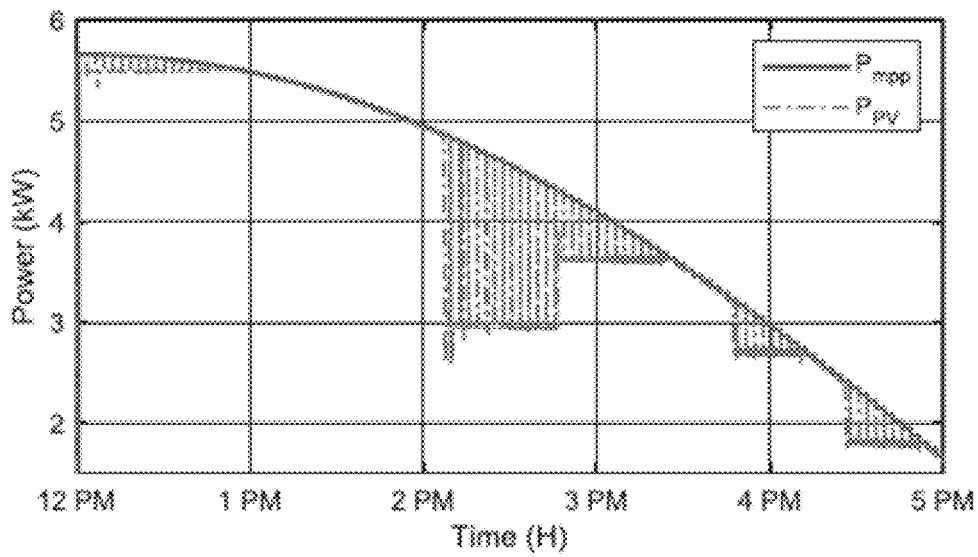
FIG. 17 is a graph showing example PV maximum power and example supplied power of the distributed energy management system of FIG. 15 over time according to an example of the present disclosure.
Figure 18:
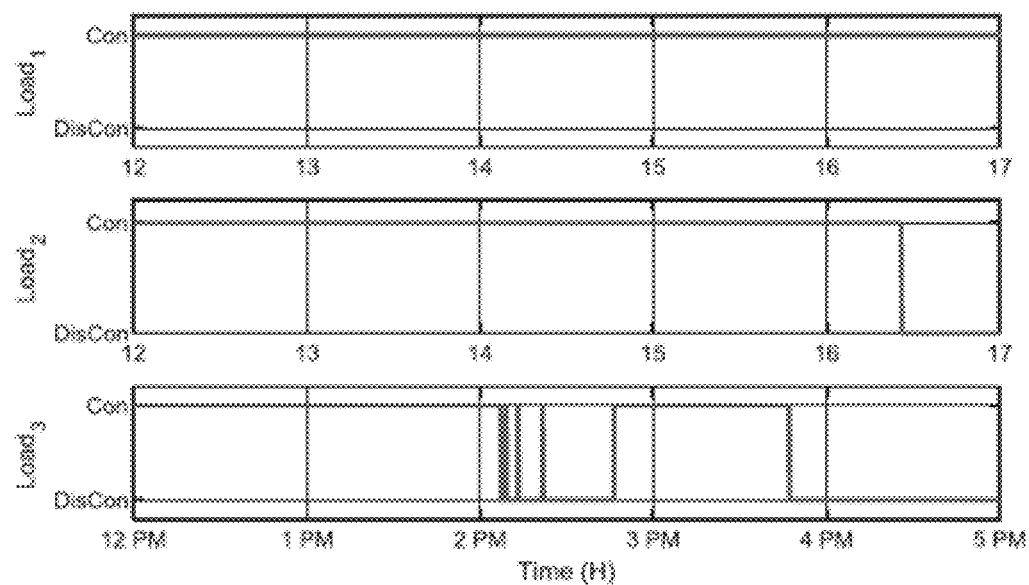
FIG. 18 is a graph showing an example status change of the loads of the distributed energy management system of FIG. 15 over time according to an example of the present disclosure.

The simulation starts when the PV source is at its peak production and it analyzes the load status as the PV produced power drops. FIG. 17 illustrates the PV maximum power and the supplied power according to time. FIG. 18 illustrates the status of the loads (e.g., connected/disconnected) according to time. As shown in FIGS. 17 and 18, initially all three loads are connected and the PV may maintain some surplus power.

In FIG. 17, the solid line is the PV maximum power that is detected every period of $T_{set}$ as indicated in FIG. 5, while the dotted line is the actual power supplied by PV source. Initially, PV maximum power is higher than the power of the three loads combined thus as shown in FIG. 18, the three loads are in the Con state. The actual power supplied by PV is less than its peak power as loads cannot consume all that power. However, every 180 seconds, due to the logic shown in FIG. 7, the PV supplied power matches the PV maximum power for very short period of time as indicated in FIG. 17 to determine the available virtual reserve of that source.

Figure 19:
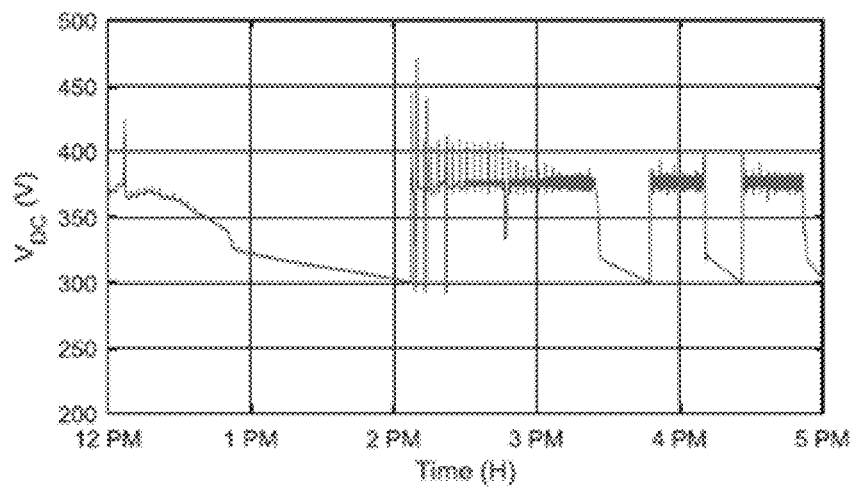
FIG. 19 is a graph showing an example DC bus voltage change of the distributed energy management system of FIG. 15 over time according to an example of the present disclosure.
Figure 20:
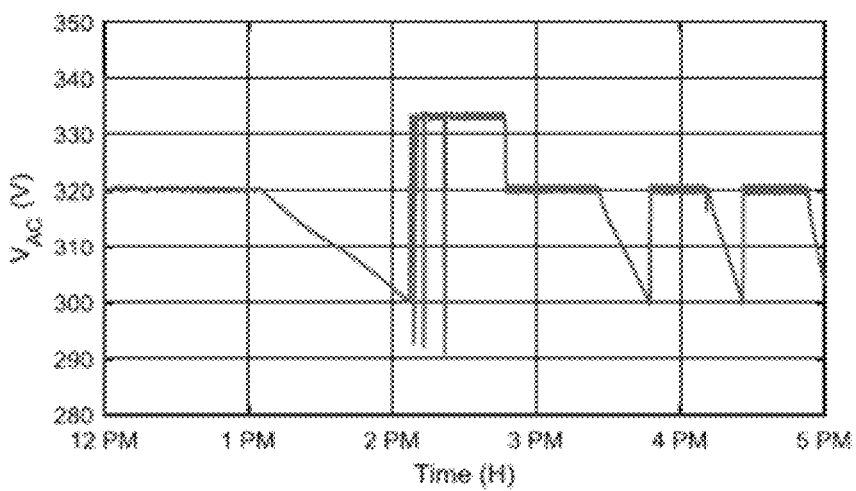
FIG. 20 is a graph showing an example AC side peak voltage change of the distributed energy management system of FIG. 15 over time according to an example of the present disclosure.

FIG. 19 shows the DC bus voltage, and FIG. 20 shows the peak AC voltage over time for this system. Initially, as the PV power has the ability to accommodate all loads, the DC bus voltage is precisely regulated at the reference value. At the same time, since the PV power reserve is less than 600 W, the AC peak voltage is regulated at $V_{AC}^{ref,1}$.

Figure 21:
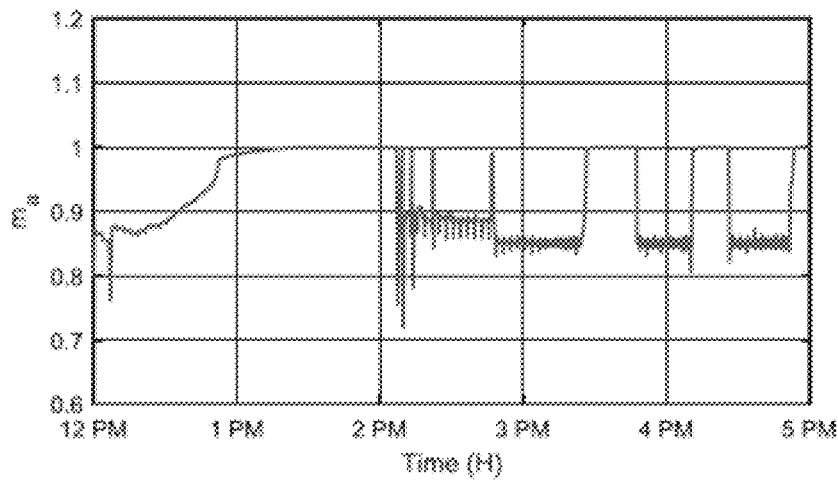
FIG. 21 is a graph showing an example variation of the value of the modulation index $m_a$ of the distributed energy management system of FIG. 15 over time to regulate the AC side voltage according to an example of the present disclosure.

As the time proceeds, the PV supplied power keeps on dropping. FIG. 17 shows that the PV supplied power gets closer to PV maximum power until the two values are matched. After this instance, the DC bus voltage keeps on dropping since the power taken by loads slightly exceeds the PV produced power, however the value of $m_a$, as shown in FIG. 21, keeps the AC peak voltage at the required value which is clearly reflected in FIG. 20. Once $m_a$ reaches the value of unity, when the DC bus voltage drops further, the peak AC voltage drops as well. The drop in the AC voltage leads to reduction in the loads consumed power as they are modelled in this simulation as constant impedances. While not wishing to be bound by a theory, this may explain the reason why all loads are on the Con state despite the fact that the PV supplied power is dropping blow their nominal power consumptions.

DC and AC side voltages keep on dropping until the AC peak voltage falls below $V_{AC}^{LOW}$. At that moment, loads controllers start their timers in preparation to turn into the DisCon state. Load$_3$ has the lowest time limit ($T_k^{OFF}$) among all loads; therefore it is the first to change its state into the DisCon as shown in FIG. 18. The disconnection of Load$_3$ causes the PV supplied power to drop with significant value below the PV maximum power as shown in FIG. 17. This situation allows the DC bus voltage to be regulated and also the PV surplus power makes the inverter set the line voltage as $V_{AC}^{ref,2}$.

Figure 22:
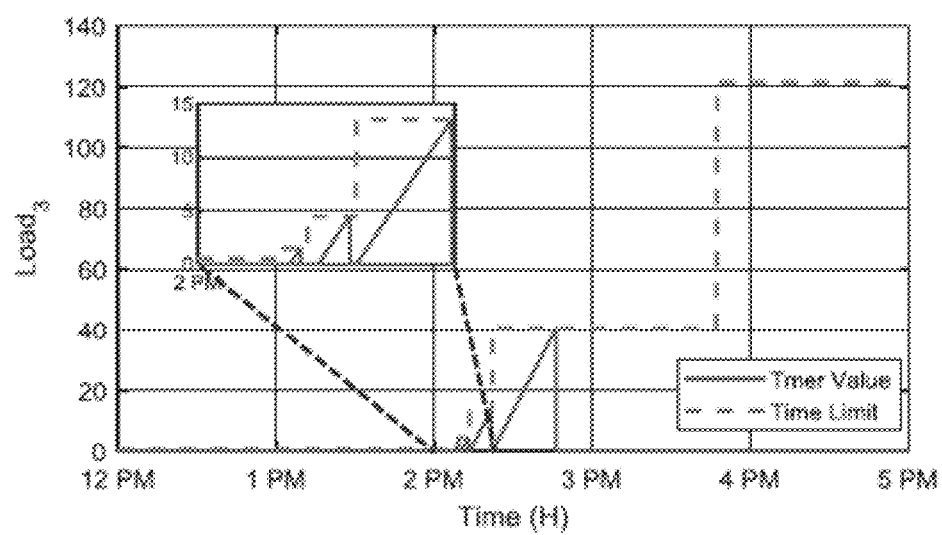
FIG. 22 is a graph showing an example variation of a timer value $(T_3^D)$ and a timer limit $(T_3^{ON})$ of Load 3 of the distributed energy management system of FIG. 15 over time according to an example of the present disclosure.

As the AC line voltage becomes higher than $V_{AC}^{UP}$, the controller of Load$_3$ applies the logic in FIG. 11 by setting/starting a timer ($T_3^D$) for this detected event. The timer eventually exceeds the time limit ($T_3^{ON}$) and Load$_3$ decides to reconnect again. However, the available PV power cannot accommodate for this added power and the AC peak voltage falls almost immediately below $V_{AC}^{LOW}$ causing Load$_3$ to disconnect once again, but in this case a larger value is set for the limit $T_3^{ON}$. This scenario is repeated several times as indicated in FIGS. 18 and 22.

At t=14.4 (2:24 PM), Load$_3$ is reduced to consume 0.9 kW rather than its previous value of 2.7 kW. Load$_3$ controller still waits for its timer to exceed the updated value of $T_3^{ON}$ before it reconnects. The timer reaches the limit as shown in FIG. 22 at 14.8 and Load$_3$ is reconnected. As shown in FIG. 17, this time, the PV surplus power is sufficient to supply this added load and thus Load$_3$ could maintain the Con status. As the PV source can still maintain some surplus power, it operates in the DC bus voltage regulation mode and thus the DC bus is properly regulated. However, the remaining surplus power is below $P_{TH}$ and that leads to the AC peak voltage to be kept at $V_{AC}^{ref,1}$.

The same scenario discussed above is repeated after this point. PV power keeps on dropping until it matches the load. Beyond this point, the DC bus keeps on dropping and $m_a$ increases to regulate the AC side peak voltage until it reaches unity value. Then, the AC side peak voltage will be decreasing and as it drops below $V_{AC}^{LOW}$, Load$_3$ disconnects again (between 3 pm and 4 pm as shown in FIG. 18) which allows the DC and AC sides voltage to recover. As PV power drops, the same sequence of event is repeated leading to Load$_2$ to disconnect (between 4 pm and 5 pm as shown in FIG. 18) as it has a lower timer limit than Load$_1$.

The operation described above shows that loads and the PV source can coordinate their power exchange properly while maintaining acceptable voltage level, with minimum fluctuation between ON/OFF operation and without having to require an involvement of central management system or inter-controllers communication network. In this way, aspects of the present disclosure may provide a distributed energy management system with improved efficiency and reliability, which can be installed for various kinds of applications for systems with PV installations.

EMBODIMENTS

Various aspects of the subject matter described herein are set out in the following numbered embodiments:

Embodiment 1. A distributed energy management system comprises: a photovoltaic (PV) source; and a plurality of controllable loads in communication with the PV source, wherein the plurality of controllable loads include: a first controllable load comprising a first interactive plug, wherein the first interactive plug is associated with a first connected state timer and a first disconnected state timer; and a second controllable load comprising a second interactive plug, wherein the second interactive plug is associated with a second connected state timer and a second disconnected state timer, wherein each of the first interactive plug and the second interactive plug is configured to monitor a current peak AC voltage ($V_{AC}^{Pk}$) of the distributed energy management system, wherein the PV source is configured to: control the current peak AC voltage ($V_{AC}^{Pk}$) to keep it at a reference AC voltage ($V_{AC}^{ref}$); determine a maximum PV power ($P_{mpp}$) that the PV source can produce at a given time; determine a difference between the maximum PV power ($P_{mpp}$) and a current PV power ($P_{PV}$); determine whether the difference is greater than a threshold power ($P_{TH}$); responsive to determining that the difference is less than or equal to the threshold power, set the reference AC voltage ($V_{AC}^{ref}$) as a first voltage ($V_{AC}^{ref\,1}$); and responsive to determining that the difference is greater than the threshold power, set the reference AC voltage as a second voltage ($V_{AC}^{ref,2}$) greater than the first voltage.

Embodiment 2. The distributed energy management system of embodiment 1, wherein each of the first interactive plug and the second interactive plug is configured to: determine whether the current peak AC voltage ($V_{AC}^{Pk}$) is lower than a first AC lower limit ($V_{AC}^{low}$); and responsive to determining that the current peak AC voltage is lower than the first AC lower limit, start a counting of the first connected state timer and the second connected state timer, respectively.

Embodiment 3. The distributed energy management system of embodiment 2, wherein the AC lower limit is lower than the first voltage ($V_{AC}^{ref\,1}$).

Embodiment 4. The distributed energy management system of embodiments-3, wherein a first set time of the first connected state timer is lower than a second set time of the second connected state timer, wherein responsive to an expiration of the first set time of first connected state timer, the first interactive plug is configured to switch from a connected state to a disconnected state.

Embodiment 5. The distributed energy management system of embodiment 4, wherein responsive to the expiration of the first set time of the first connected state timer, the first interactive plug is further configured to reset the first connected state timer.

Embodiment 6. The distributed energy management system of embodiments 4-5, wherein, after the switch to the disconnected state of the first interactive plug, the second interactive plug is configured to: determine that the current peak AC voltage is equal to or greater than the first AC lower limit; and responsive to determining that the current peak AC voltage is equal to or greater than the first AC lower limit, reset the second connected state timer.

Embodiment 7. The distributed energy management system of embodiments 4-6, wherein, after the switch to the disconnected state of the first interactive plug, the first interactive plug is configured to: determine whether the current peak AC voltage is greater than an AC upper limit ($V_{AC}^{up}$); and responsive to determining that the current peak AC voltage is greater than the AC upper limit, start a counting of the first disconnected state timer.

Embodiment 8. The distributed energy management system of embodiment 7, wherein the AC upper limit ($V_{AC}^{up}$) is lower than the second voltage ($V_{AC}^{ref2}$) and greater than the first voltage ($V_{AC}^{ref\,1}$).

Embodiment 9. The distributed energy management system of embodiments 7-8, wherein responsive to a first set time of the first disconnected state timer being expired, the first interactive plug is configured to switch from the disconnected state to the connected state.

Embodiment 10. The distributed energy management system of embodiments 7-9, wherein responsive to a first set time of the first disconnected state timer being expired, the first interactive plug is configured to increase the first set time of the first disconnected state timer.

Embodiment 11. The distributed energy management system of embodiments 4-10, wherein, after the switch to the disconnected state of the first interactive plug, the second interactive plug is configured to: determine whether the current peak AC voltage has been decreased within a predetermined time; and responsive to determining that the current peak AC voltage has not been decreased within the predetermined time, stop the counting of the second connected state timer.

Embodiment 12. The distributed energy management system of embodiments 1-11, wherein the first interactive plug is configured to: determine whether the current peak AC voltage is lower than a second AC lower limit ($V_{AC}^{k,\,lim}$); and responsive to determining that the current peak AC voltage is lower than the second AC lower limit, switch the first interactive plug from a connected state to a disconnected state.

Embodiment 13. The distributed energy management system of embodiments 1-12, further comprising a management system in communication with the PV source and the plurality of controllable loads, wherein the management system is configured to serve as a gate way to allow a user to interact with the plurality controllable loads.

Embodiment 14. The distributed energy management system of embodiments 1-13, further comprising a power socket configured to serve a controllable load with a high inrush current.

Embodiment 15. The distributed energy management system of embodiment 14, wherein a starting current of the controllable load with the high inrush current is regulated by adjusting a voltage and a frequency supplied to the controllable load with the high inrush current.

Embodiment 16. A method of controlling a distributed energy management system, wherein the distributed energy management system comprises: a photovoltaic (PV) source; and a plurality of controllable loads in communication with the PV source, wherein the plurality of controllable loads include: a first controllable load comprising a first interactive plug, wherein the first interactive plug is associated with a first connected state timer and a first disconnected state timer; and a second controllable load comprising a second interactive plug, wherein the second interactive plug is associated with a second connected state timer and a second disconnected state timer, wherein the method comprises: monitoring a current peak AC voltage ($V_{AC}^{Pk}$) of the distributed energy management system; controlling the current peak AC voltage ($V_{AC}^{Pk}$) to keep it at a reference AC voltage ($V_{AC}^{ref}$); determining a maximum PV power ($P_{mpp}$) that the PV source can produce at a given time; determining a difference between the maximum PV power ($P_{mpp}$) and a current PV power ($P_{pv}$); determining whether the difference is greater than a threshold power ($P_{TH}$); responsive to determining that the difference is less than or equal to the threshold power, setting the reference AC voltage ($V_{AC}^{ref}$) as a first voltage ($V_{AC}^{ref\,1}$); and responsive to determining that the difference is greater than the threshold power, setting the reference AC voltage as a second voltage ($V_{AC}^{ref2}$) greater than the first voltage.

Embodiment 17. The method of embodiment 16, further comprising: determining whether the current peak AC voltage ($V_{AC}^{Pk}$) is lower than a first AC lower limit ($V_{AC}^{low}$); responsive to determining that the current peak AC voltage is lower than the first AC lower limit, starting a counting of the first connected state timer and the second connected state timer, respectively.

Embodiment 18. The method of embodiment 17, wherein a first set time of the first connected state timer is lower than a second set time of the second connected state timer, wherein the method further comprises responsive to an expiration of the first set time of first connected state timer, switching the first interactive plug from a connected state to a disconnected state.

Embodiment 19. The method embodiment 18, further comprising, after the switch to the disconnected state of the first interactive plug: determining that the current peak AC voltage is equal to or greater than the first AC lower limit; and responsive to determining that the current peak AC voltage is equal to or greater than the first AC lower limit, resetting the second connected state timer.

Embodiment 20. The method of embodiments 18-19, further comprising, after the switch to the disconnected state of the first interactive plug: determining whether the current peak AC voltage is greater than an AC upper limit ($V_{AC}^{up}$); responsive to determining that the current peak AC voltage is greater than the AC upper limit, starting a counting of the first disconnected state timer; and responsive to a first set time of the first disconnected state timer being expired, switching the first interactive plug from the disconnected state to the connected state.

Reference throughout the specification to "various aspects," "some aspects," "an example," "some examples," "other examples," or "one aspect" means that a particular feature, structure, or characteristic described in connection with the aspect is included in at least one example. Thus, appearances of the phrases "in various aspects," "in some aspects," "certain embodiments," "an example" "some examples," "other examples," "certain other embodiments," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

It is to be understood that at least some of the figures and descriptions herein have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein.

The terminology used herein is intended to describe particular embodiments only and is not intended to be limiting of the present disclosure. As used herein, the singular forms "a", "an" and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term 'at least one of X or Y' or 'at least one of X and Y' should be interpreted as X, or Y, or X and Y.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A distributed energy management system comprising:
a photovoltaic (PV) source; and
a plurality of controllable loads in communication with the PV source, wherein the plurality of controllable loads include:
a first controllable load comprising a first interactive plug, wherein the first interactive plug is associated with a first connected state timer and a first disconnected state timer; and
a second controllable load comprising a second interactive plug, wherein the second interactive plug is associated with a second connected state timer and a second disconnected state timer,
wherein each of the first interactive plug and the second interactive plug is configured to monitor a current peak AC voltage ($V_{AC}^{Pk}$) of the distributed energy management system,
wherein the PV source is configured to:
control the current peak AC voltage ($V_{AC}^{Pk}$) to keep it at a reference AC voltage ($V_{AC}^{ref}$);
determine a maximum PV power ($P_{mpp}$) that the PV source can produce at a given time;
determine a difference between the maximum PV power ($P_{mpp}$) and a current PV power ($P_{pv}$);
determine whether the difference is greater than a threshold power ($P_{TH}$);
responsive to determining that the difference is less than or equal to the threshold power, set the reference AC voltage ($V_{AC}^{ref}$) as a first voltage ($V_{AC}^{ref\,1}$); and
responsive to determining that the difference is greater than the threshold power, set the reference AC voltage as a second voltage ($V_{AC}^{ref\,2}$) greater than the first voltage.

2. The distributed energy management system of claim 1, wherein each of the first interactive plug and the second interactive plug is configured to:
determine whether the current peak AC voltage ($V_{AC}^{Pk}$) is lower than a first AC lower limit ($V_{AC}^{low}$); and
responsive to determining that the current peak AC voltage is lower than the first AC lower limit, start a counting of the first connected state timer and the second connected state timer, respectively.

3. The distributed energy management system of claim 2, wherein the AC lower limit is lower than the first voltage ($V_{AC}^{ref\,1}$).

4. The distributed energy management system of claim 2, wherein a first set time of the first connected state timer is lower than a second set time of the second connected state timer,
wherein responsive to an expiration of the first set time of first connected state timer, the first interactive plug is configured to switch from a connected state to a disconnected state.

5. The distributed energy management system of claim 4, wherein responsive to the expiration of the first set time of the first connected state timer, the first interactive plug is further configured to reset the first connected state timer.

6. The distributed energy management system of claim 4, wherein, after the switch to the disconnected state of the first interactive plug, the second interactive plug is configured to:
determine that the current peak AC voltage is equal to or greater than the first AC lower limit; and
responsive to determining that the current peak AC voltage is equal to or greater than the first AC lower limit, reset the second connected state timer.

7. The distributed energy management system of claim 4, wherein, after the switch to the disconnected state of the first interactive plug, the first interactive plug is configured to:
determine whether the current peak AC voltage is greater than an AC upper limit ($V_{AC}^{up}$); and
responsive to determining that the current peak AC voltage is greater than the AC upper limit, start a counting of the first disconnected state timer.

8. The distributed energy management system of claim 7, wherein the AC upper limit ($V_{AC}^{up}$) is lower than the second voltage ($V_{AC}^{ref2}$) and greater than the first voltage ($V_{AC}^{ref1}$).

9. The distributed energy management system of claim 7, wherein responsive to a first set time of the first disconnected state timer being expired, the first interactive plug is configured to switch from the disconnected state to the connected state.

10. The distributed energy management system of claim 7, wherein responsive to a first set time of the first disconnected state timer being expired, the first interactive plug is configured to increase the first set time of the first disconnected state timer.

11. The distributed energy management system of claim 4, wherein, after the switch to the disconnected state of the first interactive plug, the second interactive plug is configured to:
determine whether the current peak AC voltage has been decreased within a predetermined time; and
responsive to determining that the current peak AC voltage has not been decreased within the predetermined time, stop the counting of the second connected state timer.

12. The distributed energy management system of claim 1, wherein the first interactive plug is configured to:
determine whether the current peak AC voltage is lower than a second AC lower limit ($V_{AC}^{k,\ lim}$); and
responsive to determining that the current peak AC voltage is lower than the second AC lower limit, switch the first interactive plug from a connected state to a disconnected state.

13. The distributed energy management system of claim 1, further comprising a management system in communication with the PV source and the plurality of controllable loads, wherein the management system is configured to serve as a gate way to allow a user to interact with the plurality controllable loads.

14. The distributed energy management system of claim 1, further comprising a power socket configured to serve a controllable load with a high inrush current.

15. The distributed energy management system of claim 14, wherein a starting current of the controllable load with the high inrush current is regulated by adjusting a voltage and a frequency supplied to the controllable load with the high inrush current.

16. The distributed energy management system of claim 1, further comprising a battery, wherein the battery is configured to be charged with a PV surplus power.

17. A method of controlling a distributed energy management system, wherein the distributed energy management system comprising:
a photovoltaic (PV) source; and
a plurality of controllable loads in communication with the PV source, wherein the plurality of controllable loads include:
a first controllable load comprising a first interactive plug, wherein the first interactive plug is associated with a first connected state timer and a first disconnected state timer; and
a second controllable load comprising a second interactive plug, wherein the second interactive plug is associated with a second connected state timer and a second disconnected state timer,
wherein the method comprises:
monitoring a current peak AC voltage ($V_{AC}^{Pk}$) of the distributed energy management system;
controlling the current peak AC voltage ($V_{AC}^{Pk}$) to keep it at a reference AC voltage ($V_{AC}^{ref}$);
determining a maximum PV power ($P_{mpp}$) that the PV source can produce at a given time;
determining a difference between the maximum PV power ($P_{mpp}$) and a current PV power ($P_{pv}$);
determining whether the difference is greater than a threshold power ($P_{TH}$);
responsive to determining that the difference is less than or equal to the threshold power, setting the reference AC voltage ($V_{AC}^{ref}$) as a first voltage ($V_{AC}^{ref1}$); and
responsive to determining that the difference is greater than the threshold power, setting the reference AC voltage as a second voltage ($V_{AC}^{ref2}$) greater than the first voltage.

18. The method of claim 17, further comprising:
determining whether the current peak AC voltage ($V_{AC}^{Pk}$) is lower than a first AC lower limit ($V_{AC}^{low}$);
responsive to determining that the current peak AC voltage is lower than the first AC lower limit, starting a counting of the first connected state timer and the second connected state timer, respectively.

19. The method of claim 18, wherein a first set time of the first connected state timer is lower than a second set time of the second connected state timer,
wherein the method further comprises responsive to an expiration of the first set time of first connected state timer, switching the first interactive plug from a connected state to a disconnected state.

20. The method claim 19, further comprising, after the switch to the disconnected state of the first interactive plug:
determining that the current peak AC voltage is equal to or greater than the first AC lower limit; and
responsive to determining that the current peak AC voltage is equal to or greater than the first AC lower limit, resetting the second connected state timer.

21. The method of claim 19, further comprising, after the switch to the disconnected state of the first interactive plug:
determining whether the current peak AC voltage is greater than an AC upper limit ($V_{AC}^{up}$);

responsive to determining that the current peak AC voltage is greater than the AC upper limit, starting a counting of the first disconnected state timer; and responsive to a first set time of the first disconnected state timer being expired, switching the first interactive plug from the disconnected state to the connected state.

22. The method of claim 17, further comprising charging a battery with a PV surplus power.

* * * * *